United States Patent
Park et al.

(10) Patent No.: US 9,725,581 B2
(45) Date of Patent: Aug. 8, 2017

(54) POLYCYCLOHEXYLENEDIMETHYLENE TEREPHTHALATE RESIN COMPOSITION

(71) Applicant: SK CHEMICALS CO., LTD., Gyeonggi-do (KR)

(72) Inventors: Kyu-Tae Park, Gyeonggi-do (KR); Min-Goo Kang, Daejeon (KR); Tae-Woong Lee, Gyeonggi-do (KR); Jong-Wook Shin, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 0 days.

(21) Appl. No.: 15/035,585

(22) PCT Filed: Nov. 11, 2014

(86) PCT No.: PCT/KR2014/010813
§ 371 (c)(1),
(2) Date: May 10, 2016

(87) PCT Pub. No.: WO2015/072725
PCT Pub. Date: May 21, 2015

(65) Prior Publication Data
US 2016/0272787 A1    Sep. 22, 2016

(30) Foreign Application Priority Data
Nov. 12, 2013  (KR) .................. 10-2013-0137061

(51) Int. Cl.
*C08K 3/00*   (2006.01)
*C08K 7/14*   (2006.01)
*C08K 3/22*   (2006.01)

(52) U.S. Cl.
CPC .............. *C08K 7/14* (2013.01); *C08K 3/0033* (2013.01); *C08K 3/22* (2013.01); *C08K 2003/2241* (2013.01)

(58) Field of Classification Search
CPC ..... C08K 7/14; C08K 3/22; C08K 2003/2241
USPC ........................................................ 524/404
See application file for complete search history.

(56) References Cited

FOREIGN PATENT DOCUMENTS

| CN | 101688056 | | 3/2010 |
|---|---|---|---|
| CN | 102272197 | | 12/2011 |
| JP | 2000-178349 | A | 6/2000 |
| KR | 20090041974 | A * | 4/2009 |
| KR | 10-2011-0119627 | A | 11/2011 |
| KR | 10-2013-0069487 | A | 6/2013 |
| KR | 10-2013-0076027 | A | 7/2013 |
| KR | 20130076027 | A * | 7/2013 |
| WO | WO 92-01013 | A1 | 1/1992 |

OTHER PUBLICATIONS

Translation of KR20130076027, Jul. 8, 2013.*
Translation of KR20090041974, Apr. 29, 2009.*
International Search Report prepared by the Korean International Property Office on Feb. 13, 2015, for International Application No. PCT/KR2014/010813.

* cited by examiner

*Primary Examiner* — Hui Chin
(74) *Attorney, Agent, or Firm* — Sheridan Ross P.C.

(57) ABSTRACT

The present invention relates to a polycyclohexylenedimethylene terephthalate resin composition having improved reflectivity, heat resistance, and yellowing resistance. The resin composition according to one embodiment of the present invention includes 40 to 95 wt % of polycyclohexylenedimethylene terephthalate resin; 1 to 50 wt % of a white pigment; and 1 to 50 wt % of a filler, and the amount of germanium (Ge) atoms remaining in the resin is 30 to 1,000 ppm based on the weight of the resin.

11 Claims, No Drawings

POLYCYCLOHEXYLENEDIMETHYLENE TEREPHTHALATE RESIN COMPOSITION

CROSS REFERENCE TO RELATED APPLICATIONS

This application is a national stage application under 35 U.S.C. 371 and claims the benefit of PCT Application No. PCT/KR2014/010813 having an international filing date of Nov. 11, 2014, which designated the United States, which PCT application claimed the benefit of Korean Patent Application No. 10-2013-0137061 filed Nov. 12, 2013, the disclosures of each of which are incorporated herein by reference.

TECHNICAL FIELD

The present invention relates to a polycyclohexylenedimethylene terephthalate resin composition having improved reflectivity, heat resistance, and yellowing resistance.

BACKGROUND OF THE INVENTION

Polycyclohexylenedimethylene terephthalate (PCT) is now receiving attention as a new material which can overcome the problem of polyester materials such as polyethylene terephthalate (PET), polybutylene terephthalate (PBT), and so on, i.e., the problem that they have been only applied to restrictive uses because of their poor formability and low thermal deformation temperature due to slow crystallization rate.

The PCT is a crystalline polyester prepared by esterification reaction or trans-esterification reaction of terephthalic acid (hereinafter, 'TPA') or dimethyl terephthalate (hereinafter, 'DMT') and 1,4-cyclohexanedimethanol (hereinafter, 'CHDM'), and has high melting point (Tm) and rapid crystallization rate. Since the PCT was first developed in the 1960s, it has been mainly used for carpets because of the characteristic soft feel of the PCT fiber but the use of the PCT has gradually decreased with the appearance of polyamide. Meanwhile, the PCT compound formulation was developed in the engineering plastic field in the 1980s and the PCT has been used for connectors and heat resistance parts in electrical and electronic industry field and automobile industry field requiring high heat resistance.

On the other hand, light emitting diode (LED) takes center stage with rapidly replacing a large number of existing light sources because of its excellent energy efficiency and lifespan. LED is generally composed of a semiconductor composing light emitting part, solder wires, a reflection plate, and a transparent encapsulant for encapsulating the semiconductor. Among them, the reflection plate was made of various materials, for example, ceramics or heat resistance plastics, but the ceramics had a problem in the productivity and the heat resistance plastics had a problem of falling-off in optical reflectivity because of variation in color in the process of preparing the reflection plate such as the injection molding process or the process for heat-curing the encapsulant or in the real usage environment condition of LED.

Particularly, since LED shows excellent energy efficiency and lifespan, high levels of reflectivity and heat resistance are required so that the reflection plate is used as LED parts and accessories, for example, the drop in the reflectivity after yellowing test of about 6,000 hrs at the reference temperatures such as about 25° C., about 55° C., about 85° C., or real LED operating temperature must be about 8% or less. Therefore, the studies about the materials which can maintain their high reflectivity even under severe conditions are needed.

DETAILS OF THE INVENTION

Objects of the Invention

It is an aspect of the present invention to provide a polycyclohexylenedimethylene terephthalate resin composition that is excellent in reflectivity, heat resistance, and yellowing resistance, and particularly, suitable to be used as a LED reflector material.

Means for Achieving the Object

According to one embodiment of the present invention, a polycyclohexylenedimethylene terephthalate resin composition including 40 to 95 wt % of polycyclohexylenedimethylene terephthalate resin; 1 to 50 wt % of a white pigment; and 1 to 50 wt % of a filler, wherein the amount of germanium (Ge) atoms remaining in the polycyclohexylenedimethylene terephthalate resin is 30 to 1,000 ppm based on the weight of the polycyclohexylenedimethylene terephthalate resin is provided.

For an example, the polycyclohexylenedimethylene terephthalate resin in which a small amount of the germanium atoms remains may be a resin polymerized in the presence of a germanium compound. And, for another example, the polycyclohexylenedimethylene terephthalate resin may be what is polymerized in the presence of germanium compound and titanium compound.

The resin composition having more improved reflectivity, weather resistance, and yellowing resistance may be obtained by using 12 to 35 wt % of the white pigment. And, the white pigment may be at least one selected from the group consisting of titanium oxide, zinc oxide, lithopone ($BaSO_4 \cdot ZnS$), white lead ($2PbCO_3 \cdot Pb(OH)_2$), calcium carbonate, and boron nitride. The white pigment may be inorganic treated one or organic treated one. And, the particle size of the white pigment may be 0.05 to 2.0 µm.

The resin composition having more improved reflectivity, weather resistance, and yellowing resistance may be obtained by using 1 to 27 wt % of the filler. The filler may be at least one selected from the group consisting of glass fibers, carbon fibers, boron fibers, glass beads, glass flakes, talc, wollastonite, calcium titanate whiskers, aluminum boric acid whiskers, zinc oxide whiskers, and calcium whiskers. For example, it is possible to provide the resin composition having excellent mechanical strength by using glass fibers of which the average length is 0.1 to 20 mm and the aspect ratio is 10 to 1,000 as the filler.

When 12 to 35 wt % of the white pigment and 1 to 27 wt % of the filler are used in the resin composition, 40 to 85 wt % of the polycyclohexylenedimethylene terephthalate resin may be used for providing the resin composition having more improved reflectivity, weather resistance, and yellowing resistance.

The polycyclohexylenedimethylene terephthalate resin may be obtained by esterification reaction of dicarboxylic acids and diol compounds or by trans-esterification reaction of dicarboxylic acid ester compounds and diol compounds. At this time, the resin composition having more excellent weather resistance and yellowing resistance can be provided by using the resin obtained by using terephthalic acid as the whole dicarboxylic acid, the resin obtained by using dimethyl terephthalate as the whole dicarboxylic acid ester compound, or the resin obtained by using cyclohexane dimethanol as the whole diol compound.

Meanwhile, according to another embodiment of the present invention, an article formed from the polycyclohexylenedimethylene terephthalate resin composition including 40 to 95 wt % of polycyclohexylenedimethylene terephthalate resin; 1 to 50 wt % of a white pigment; and 1 to 50 wt % of a filler, wherein the amount of germanium (Ge) atoms remaining in the polycyclohexylenedimethylene terephthalate resin is 30 to 1,000 ppm based on the weight of the polycyclohexylenedimethylene terephthalate resin is provided. The article has excellent reflectivity, heat resistance, and yellowing resistance, and it can be used as a LED reflector that needs said properties.

Specifically, the color-b value of the article that is measured after storing the same at 170° C. for 120 hrs is 0 to 4, and thus it has very excellent yellowing resistance.

Furthermore, the article may show the reflectivity of 90% or more that is measured to the light of 450 nm wavelength with total reflection mode (SCI mode). And, the article may have excellent maintenance of reflectivity to the point of satisfying the following Equation 1 because it is superior in heat resistance.

$$93\% \leq Y = R^t/R^0 * 100 \quad \text{[Equation 1]}$$

In Equation 1, Y is the maintenance of the reflectivity, $R^0$ is the reflectivity to the light of 450 nm wavelength measured with total reflection mode (SCI mode) by using the article, and $R^t$ is the reflectivity to the light of 450 nm wavelength measured with total reflection mode (SCI mode) after storing the article at 170° C. for 120 hrs. And, the article is superior in weather resistance and it can maintain its excellent reflectivity even under high temperature and humidity circumstances. Concretely, the reflectivity to the light of 450 nm wavelength measured with total reflection mode (SCI mode) after storing the article at the temperature of 85° C. and the relative humidity of 85% for 500 hrs may be 90% or more.

Effects of the Invention

The polycyclohexylenedimethylene terephthalate resin composition according to the present invention is superior in reflectivity, heat resistance, and yellowing resistance and suitable to be used as a reflection plate, and particularly, it is suitable to be used as a LED reflector material.

DETAILED DESCRIPTION OF THE EMBODIMENT

The present invention can be variously modified and have various examples, and specific examples of the present invention are explained in this description. However, it is not intended to limit the present invention to the specific examples and it must be understood that the present invention includes every modifications, equivalents, or replacements included in the idea and technical scope of the present invention. In explaining the present invention, if a specific explanation about prior art which is related to the present invention may cloud the essentials of the present invention, the explanation is skipped.

According to one embodiment of the present invention, a polycyclohexylenedimethylene terephthalate resin composition including 40 to 95 wt % of polycyclohexylenedimethylene terephthalate resin; 1 to 50 wt % of a white pigment; and 1 to 50 wt % of a filler, wherein the amount of germanium (Ge) atoms remaining in the polycyclohexylenedimethylene terephthalate resin is 30 to 1,000 ppm based on the weight of the polycyclohexylenedimethylene terephthalate resin is provided.

In addition, according to another embodiment of the present invention, an article formed from the polycyclohexylenedimethylene terephthalate resin composition is provided.

Hereinafter, the polycyclohexylenedimethylene terephthalate (hereinafter, 'POT') resin composition according to concrete embodiment of the present invention is explained in more detail.

Existing ceramics or heat resistant plastics which have been used to LED reflection plates have a problem of falling-off in optical reflectivity because of variation in color in the process of preparing the reflection plate such as the injection molding process and the process for heat-curing the encapsulant, and in the real operation environment condition of LED.

Accordingly, the present inventors recognized the fact that the resin composition that is superior in reflectivity, heat resistance, and yellowing resistance and suitable to be used as a reflection plate, and particularly, suitable to be used as a LED reflector material can be obtained by mixing 1 to 50 wt % of a white pigment and 1 to 50 wt % of a filler with 40 to 95 wt % of PCT resin in which germanium (Ge) atoms remain in the amount of 30 to 1,000 ppm based on the weight of the PCT resin, and accomplished the present invention.

The PCT resin can be obtained by esterification reaction of dicarboxylic acids and diol compounds or by trans-esterification reaction of dicarboxylic acid ester compounds and diol compounds, as known in the art to which the present invention pertains.

30 to 1,000 ppm, 30 to 800 ppm, 30 to 600 ppm, 30 to 500 ppm, 30 to 400 ppm or 50 to 350 ppm of germanium atoms can remain in the PCT resin. If the amount of germanium atoms remaining in the resin is less than said range, the polymerization reaction speed of the PCT resin delays, and consequently the polymer obtained therefrom can be easily yellowed. In contrast, if the amount of germanium atoms remaining in the resin is larger than said range, the thermal degradation speed of the resin increases, and consequently the resin having the degree of polymerization of desired level cannot be obtained, or the transparency of the resin may be adversely affected because the haze value increases due to the catalyst component remaining in the resin.

Concretely, the PCT resin in which a small amount of germanium atoms remains can be obtained by using a germanium compound as a catalyst of the esterification reaction or the trans-esterification reaction. The specific kind of the germanium compound is not limited particularly but, for example, germanium dioxide and so on may be used.

Furthermore, a small amount of titanium (Ti) atoms may remain in the PCT resin. Specifically, 20 ppm or less, 0.1 to 20 ppm, or 5 to 15 ppm of titanium atoms may remain in the PCT resin. The PCT resin can be polymerized without concern about side reactions and the problem that the molecular weight decreases in extrusion or injection molding process can be prevented by including titanium atoms within said range, and thus the resin can have excellent yellowing resistance.

As disclosed above, the PCT resin in which a small amount of germanium and titanium atoms remains can be obtained by using a germanium compound and a titanium compound as a catalyst of the esterification reaction or the trans-esterification reaction. The specific kind of the titanium compound which can be used as a catalyst is not limited particularly but, for example, titanium oxide, tetra-n-propyl titanate, tetra-isopropyl titanate, tetra-n-butyl titanate, tetra-isobutyl titanate, butyl-isopropyl titanate, and so on may be used.

The PCT resin can be obtained by esterification reaction of dicarboxylic acids and diol compounds or by trans-esterification reaction of dicarboxylic acid ester compounds and diol compounds in the presence of said catalyst.

The dicarboxylic acid may include terephthalic acid (TPA), isophthalic acid (IPA), 2,6-naphthalene dicarboxylic acid (2,6-NDA), or a mixture thereof. For example, 90 parts by weight or more in the whole dicarboxylic acid may be terephthalic acid. And, 10 parts by weight or less in the whole dicarboxylic acid may be other dicarboxylic acids except terephthalic acid. Particularly, when the whole dicarboxylic acid is terephthalic acid, it is possible to provide the resin composition having excellent weather resistance and yellowing resistance.

The dicarboxylic acid ester compound may include dimethyl terephthalate, dimethyl isophthalate (DMI), dimethyl 2,6-naphthalene dicarboxylate (2,6-NDC), or a mixture thereof. For example, 90 parts by weight or more in the whole dicarboxylic acid ester compound may be dimethyl terephthalate. And, 10 parts by weight or less in the whole dicarboxylic acid ester compound may be other dicarboxylic acid ester compounds. Particularly, when the whole dicarboxylic acid ester compound is dimethyl terephthalate, it is possible to provide the resin composition having excellent weather resistance and yellowing resistance.

The diol compound may include at least one selected from the group consisting of cyclohexane dimethanol, ethylene glycol, diethylene glycol, 1,4-butanediol, 1,3-propanediol, and neopentyl glycol. For example, 90 parts by weight or more in the whole diol compound may be cyclohexane dimethanol. And, 10 parts by weight or less in the whole diol compound may be other diol compounds except cyclohexane dimethanol. Particularly, in the case of diol compound, when the whole diol compound is cyclohexane dimethanol, it is possible to provide the resin composition having more excellent weather resistance and yellowing resistance.

Meanwhile, it is possible to prepare the PCT resin by adding a phosphorus-based stabilizer thereto at the initial stage of the esterification reaction or the trans-esterification reaction. Consequently, it is possible to suppress the side reaction which may occur during the esterification reaction or the trans-esterification reaction of high temperature.

As the phosphorus-based stabilizer which can be used above reaction, phosphoric acid-based compound such as phosphoric acid and phosphorous acid, and phosphate-based compound such as triethyl phosphate, trimethyl phosphate, triphenyl phosphate, triethyl phosphonoacetate, and the like may be used.

The PCT resin also can be polymerized by further using other additives which are commonly used in the art to which the present invention pertains, in addition to the compounds disclosed above. And, the PCT resin can be polymerized by using such components according to a method commonly used in the art to which the present invention pertains. For non-restrictive example, the PCT resin may be prepared through the steps of carrying out esterification reaction of dicarboxylic acids and diol compounds or trans-esterification reaction of dicarboxylic acid ester compounds and diol compounds in the presence of said catalyst; and carrying out polycondensation reaction of the product of above reaction. Furthermore, the method of preparing the PCT resin may further include the steps of making the product of polycondensation reaction into pellets; and/or crystallizing the product of polycondensation reaction or the pellets and carrying out solid-state polymerization thereof.

Such PCT resin may be used in the amount of 40 to 95 wt %, 40 to 90 wt %, or 40 to 85 wt %, based on the total weight of the resin composition. The resin composition having superior reflectivity, heat resistance, and yellowing resistance can be prepared by mixing the PCT resin with the white pigment and the filler within said range.

The white pigment, for example, may be at least one selected from the group consisting of titanium oxide, zinc oxide, lithopone ($BaSO_4 \cdot ZnS$), white lead ($2PbCO_3 \cdot Pb(OH)_2$), calcium carbonate, and boron nitride. Particularly, when titanium oxide ($TiO_2$) is used as the white pigment, the resin composition having improved optical characteristics such as reflectivity and concealment can be provided. Furthermore, a rutile type titanium oxide may be used as the titanium oxide in order to maximize such effect.

The particle size of the white pigment is not limited particularly but, for example, the particle diameter may be 0.05 to 2.0 μm.

And, the white pigment may be inorganic treated one or organic treated one. Specifically, the inorganic treated white pigment may be the pigment that is treated with an inorganic surface treating agent such as alumina ($Al_2O_3$), silica ($SiO_2$), zirconia ($ZrO_2$), sodium silicate, sodium aluminate, sodium aluminum silicate, zinc oxide, mica, or a mixture thereof, for example. And, the organic treated white pigment may be the pigment that is treated with an organic surface treating agent such as polydimethylsiloxane, trimethylpropane (TMP), pentaerythritol, or a mixture thereof, for example. The surface treated pigment may be provided by using about 0.3 to 10 parts by weight of the inorganic or organic surface treating agent per 100 parts by weight of the white pigment. For example, it is possible to use titanium oxide of which the surface is treated with alumina under about 5 parts by weight per 100 parts by weight of titanium oxide as the white pigment, in order to obtain the effects of reflectivity, heat resistance, and yellowing resistance that are the purpose of the present invention. Furthermore, the titanium oxide surface-treated with alumina can be further modified with the inorganic surface treating agent or the organic surface treating agent.

Such white pigment may be used in the amount of 1 to 50 wt %, 5 to 40 wt %, or 12 to 35 wt % based on the total weight of the resin composition. If the amount of the white pigment is less than said range, reflectivity and yellowing resistance may decrease, and if the amount is larger than said range, impact strength may decrease.

As the filler, any organic filler or inorganic filler that is commonly used in the art to which the present invention pertains may be used. Such filler, for example, may be at least one selected from the group consisting of glass fibers, carbon fibers, boron fibers, glass beads, glass flakes, talc, wollastonite, calcium titanate whiskers, aluminum boric acid whiskers, zinc oxide whiskers, and calcium whiskers.

For example, whisker-type fillers may be used as the filler in order to provide an article having excellent surface leveling property. Particularly, glass fibers, wollastonite, calcium titanate whiskers, aluminum boric acid whiskers, or a mixture thereof may be used as the filler in order to provide an article that is white and superior in surface leveling property. Furthermore, the formability of the composition, and the mechanical properties such as tensile strength, bending strength, bending modulus, and the like and the heat resistance such as heat distortion temperature of the article may be improved by using glass fibers among them.

When glass fiber is used as the filler, glass fibers having the average length of 0.1 to 20 mm or 0.3 to 10 mm may be used. And, the resin composition having excellent mechanical strength can be provided by using glass fibers of which the aspect ratio [L(average length of fibers)/D(average diameter of fibers)] is 10 to 2000 or 30 to 1000.

Such filler may be used in the amount of 1 to 50 wt %, 1 to 40 wt %, or 1 to 27 wt % based on the total weight of the resin composition. It is possible to provide the resin composition having excellent mechanical properties and heat resistance by using the filer within said range.

In one embodiment, the resin composition having more improved reflectivity, weather resistance, and yellowing resistance may be provided by using 40 to 85 wt % of the polycyclohexylenedimethylene terephthalate resin, 12 to 35 wt % of the white pigment, and 1 to 27 wt % of the filler.

The resin composition may further include other additives which are commonly used in the art to which the present invention pertains in addition to the PCT resin, the white pigment, and the filler. For non-restrictive example, the resin composition may further include at least one additives selected from the group consisting of a primary antioxidant, a secondary antioxidant, a thermal stabilizer, a UV stabilizer, a hydrolysis stabilizer, a nucleating agent, a thickener, a releasing agent, a lubricant, a fluorescent whitening agent, a property reinforcing agent, a chain extender, a pigment, and a dye.

As disclosed above, the resin composition according to one embodiment of the present invention has excellent heat resistance and moisture resistance, and can be used as the material for the articles requiring such properties. Particularly, the resin composition is superior in reflectivity because it includes an adequate amount of the white pigment, and it has the characteristics that the decrease of reflectivity is small and the yellowing phenomenon scarcely appears even when it is left in high temperature and humidity circumstances. Therefore, the resin composition is suitable to be used as the material of the LED reflector which is continuously exposed to high temperature circumstances.

Furthermore, according to another embodiment of the present invention, an article formed from the resin composition is provided. The method of preparing the article from the resin composition is well known in the art to which the present invention pertains and thus details of the same are skipped in this description.

The article can show high reflectivity because of including the PCT resin including a small amount of germanium atoms, the white pigment, and the filler. Specifically, the article may show the initial reflectivity of 90% or more, 93% or more, or 94% or more that is measured to the light of 450 nm wavelength with total reflection mode (Super Component Inclusion mode) after the preparation. The initial reflectivity may be the value measured by using the article formed from the resin composition. Details of the method for measuring the reflectivity are shown in Examples disclosed below.

Furthermore, the article has excellent heat resistance and can maintain its excellent reflectivity even it is left in high temperature circumstances. For example, the article may have very high reflectivity of 86.5% or more, 90% or more, or 91% or more that is measured to the light of 450 nm wavelength with total reflection mode (SCI mode) after storing the same at 170° C. for 120 hrs. Particularly, the article may show excellent maintenance of reflectivity to the point of satisfying the following Equation 1.

$$93\% \leq Y = R^t/R^0 * 100 \quad \text{[Equation 1]}$$

In Equation 1, Y is the maintenance of reflectivity, $R^0$ is the reflectivity to the light of 450 nm wavelength measured with total reflection mode (SCI mode) by using the article, and $R^t$ is the reflectivity to the light of 450 nm wavelength measured with total reflection mode (SCI mode) after storing the article at 170° C. for 120 hrs. The reflectivity may be the value measured by the same method for measuring the initial reflectivity disclosed above.

Furthermore, the article has excellent weather resistance and can maintain its high reflectivity even in high temperature and humidity circumstances. For example, the article may have the reflectivity of 90% or more or 93% or more that is measured to the light of 450 nm wavelength with total reflection mode (SCI mode) after storing the same at the temperature of 85° C. and the relative humidity of 85% for 500 hrs.

As disclosed above, the article has high reflectivity and can maintain its high reflectivity even under severe circumstances because it also has excellent heat resistance and weather resistance. Therefore, it is expected that the article is used as reflectors of light emitting devices such as indoor lighting devices, outdoor lighting devices, automotive lighting devices, display devices, headlights, and so on, and can provide products having long lifespan.

Particularly, the article has very excellent yellowing resistance. For example, the color-b value of the article that is measured after storing the same at 170° C. for 120 hrs may be about 0 to about 4, about 0 to about 3, or about 0 to about 2.7. And, the color-L value that is measured after storing the same at said condition may be 87 or more. Therefore, the article can be suitably used to the LED reflector that needs high heat resistance, weather resistance, and yellowing resistance even at high temperature circumstances.

Hereinafter, preferable Examples of the present invention are explained in more detail. However, the following Examples are only for illustrating the present invention and the details of the present invention are not limited to or by them.

EXAMPLES AND COMPARATIVE EXAMPLES

The resin compositions including the ingredients of the following Tables 1 and 2 were prepared. And the resin compositions were melted, mixed, and made into pellets by using an twin extruder of 240° C. to 330° C.

TABLE 1

| | | Examples | | | | | | | | |
|---|---|---|---|---|---|---|---|---|---|---|
| Types | | 1 | 2 | 3 | 4 | 5 | 6 | 7 | 8 | 9 |
| PCT | PCT-A | 60 | | | | | | | 60 | |
| | PCT-B | | 60 | | | | | 80 | | 45 |
| | PCT-C | | | 60 | | | | | 60 | |
| | PCT-D | | | | | | | | | |
| | PCT-E | | | | | | | | | |
| | PCT-F | | | | | | | | | |
| | PCT-G | | | | 60 | | | | | |
| | PCT-H | | | | | 60 | | | | |
| White Pigment | | 20 | 20 | 20 | 20 | 20 | 10 | 30 | 10 | 30 |
| Filler | | 20 | 20 | 20 | 20 | 20 | 10 | 10 | 30 | 25 |

TABLE 2

|  | Types | Comparative Examples | | | | | | |
|---|---|---|---|---|---|---|---|---|
|  |  | 1 | 2 | 3 | 4 | 5 | 6 | 7 |
| PCT | PCT-A | | | | | | | |
|  | PCT-B | | | | | | | |
|  | PCT-C | | | | | | | |
|  | PCT-D | 60 | | | | 60 | | |
|  | PCT-E | | 60 | | 80 | | 60 | |
|  | PCT-F | | | 60 | | | | 45 |
|  | PCT-G | | | | | | | |
|  | PCT-H | | | | | | | |
| White Pigment | | 20 | 20 | 20 | 10 | 30 | 10 | 30 |
| Filler | | 20 | 20 | 20 | 10 | 10 | 30 | 25 |

The PCT (polycyclohexylenedimethylene terephthalate) resins of Tables 1 and 2 were prepared by the following method, the white pigment was titanium dioxide (17008 Grade) of Resino Co., and the filler was glass fiber (CS321 Grade) of KCC Co.

PCT-A:

The PCT resin, polymerized from cyclohexane dimethanol (CHDM) and terephthalic acid (TPA) by using titanium compound and germanium compound as the catalyst, wherein the amount of titanium (Ti) atoms remaining in the polymerized PCT resin is 10 ppm and the amount of germanium (Ge) atoms is 75 ppm based on the weight of the PCT resin.

PCT-B:

The PCT resin, prepared by the same method as PCT-A except that the amount of the titanium compound and the germanium compound were changed, wherein the amount of titanium (Ti) atoms remaining in the polymerized PCT resin is 10 ppm and the amount of germanium (Ge) atoms is 150 ppm based on the weight of the PCT resin.

PCT-C:

The PCT resin, prepared by the same method as PCT-A except that the germanium compound was used as the catalyst, wherein the amount of germanium (Ge) atoms remaining in the polymerized PCT resin is 300 ppm based on the weight of the PCT resin.

PCT-D:

The PCT resin, prepared by the same method as PCT-A except that the titanium compound was used as the catalyst, wherein the amount of titanium (Ti) atoms remaining in the polymerized PCT resin is 15 ppm based on the weight of the PCT resin.

PCT-E:

The PCT resin, prepared by the same method as PCT-A except that the titanium compound was used as the catalyst, wherein the amount of titanium (Ti) atoms remaining in the polymerized PCT resin is 48 ppm based on the weight of the PCT resin.

PCT-F:

The PCT resin, prepared by the same method as PCT-A except that the antimony compound was used as the catalyst, wherein the amount of antimony (Sb) atoms remaining in the polymerized PCT resin is 300 ppm based on the weight of the PCT resin.

PCT-G:

The PCT resin, prepared by the same method as PCT-B except that 90 parts by weight of cyclohexane dimethanol and 10 parts by weight of ethylene glycol were used as the diol compound.

PCT-H:

The PCT resin, prepared by the same method as PCT-B except that 90 parts by weight of terephthalic acid and 10 parts by weight of isophthalic acid were used as the dicarboxylic acid.

Experimental Examples

Each of the pellets obtained in Examples and Comparative Examples was injection molded into a flat panel at 280 to 300° C. Mechanical properties and reflectivity of the specimens obtained like this were measured by the following methods, and the results are listed in Tables 3 and 4.

(1) Initial Reflectivity: the specimen was exposed to the light of 370 nm to 740 nm wavelength and the reflectivity to the light of 450 nm wavelength was measured by using a UV-vis-NIR spectrometer (Konica Minoltaft Spectrophotometer "CM-3600d"). The reflectivity was measured with total reflection mode (Specular Component Inclusion (SCI) mode) of measuring diffuse reflection including specular reflection.

(2) Heat Resistance: after storing the specimen at the temperature of 170° C. for 120 hrs, the specimen was exposed to the light of 370 nm to 740 nm wavelength and the reflectivity to the light of 450 nm wavelength was measured by using a UV-vis-NIR spectrometer (Konica Minoltaft Spectrophotometer "CM-3600d"). The reflectivity was measured with total reflection mode (SCI mode) of measuring diffuse reflection including specular reflection.

(3) Maintenance of Reflectivity: maintenance of reflectivity was measured according to the following Equation 2.

$$Y = R^r/R^0 * 100 \quad [\text{Equation 2}]$$

said $R^0$ is the reflectivity obtained by the measuring method of (1) Initial Reflectivity, and $R^r$ is the reflectivity after storing at high temperature obtained by the measuring method of (2) Heat Resistance.

(4) Weather Resistance: after storing the specimen at the temperature of 85° C. and the relative humidity of 85% for 500 hrs, the specimen was exposed to the light of 370 nm to 740 nm wavelength and the reflectivity to the light of 450 nm wavelength was measured by using a UV-vis-NIR spectrometer (Konica Minoltaft Spectrophotometer "CM-3600d"). The reflectivity was measured with total reflection mode (SCI mode) of measuring diffuse reflection including specular reflection.

(5) Yellowing Resistance: after storing the specimen at the temperature of 170° C. for 120 hrs, the degree of yellowing was observed through color-b (Hunter Lab standard) measured by using a color difference meter. Higher color-b value means that there is more yellowness phenomenon.

TABLE 3

|  | Examples | | | | | | | | |
|---|---|---|---|---|---|---|---|---|---|
|  | 1 | 2 | 3 | 4 | 5 | 6 | 7 | 8 | 9 |
| Initial Reflectivity [%] | 94.2 | 94.5 | 94.8 | 94.0 | 94.1 | 93.0 | 95.7 | 92.6 | 95.0 |
| Heat Resistance [%] | 90.7 | 91.7 | 92.4 | 91.0 | 90.8 | 87.5 | 92.4 | 86.58 | 91.6 |

TABLE 3-continued

| | Examples | | | | | | | | |
|---|---|---|---|---|---|---|---|---|---|
| | 1 | 2 | 3 | 4 | 5 | 6 | 7 | 8 | 9 |
| Maintenance of Reflectivity [%] | 96.3 | 97.0 | 97.5 | 96.8 | 96.5 | 94.1 | 96.6 | 93.5 | 96.4 |
| Weather Resistance [%] | 93.6 | 93.8 | 94.0 | 92.0 | 91.8 | 90.7 | 95.0 | 90.1 | 94.2 |
| Yellowing Resistance | 2.7 | 2.7 | 2.4 | 2.8 | 2.8 | 2.9 | 2.0 | 3.0 | 2.4 |

TABLE 4

| | Comparative Examples | | | | | | |
|---|---|---|---|---|---|---|---|
| | 1 | 2 | 3 | 4 | 5 | 6 | 7 |
| Initial Reflectivity [%] | 93.0 | 92.5 | 83.6 | 91.8 | 94.0 | 90.1 | 84.6 |
| Heat Resistance [%] | 86.3 | 83.5 | 75.7 | 80.6 | 85.7 | 77.5 | 78.3 |
| Maintenance of Reflectivity [%] | 92.8 | 90.3 | 90.6 | 87.8 | 91.2 | 86.0 | 92.6 |
| Weather Resistance [%] | 91.2 | 90.6 | 81.0 | 89.6 | 92.5 | 87.8 | 83.9 |
| Yellowing Resistance | 2.9 | 3.1 | 7.0 | 3.1 | 2.7 | 3.5 | 5.1 |

Referring to Tables 3 and 4, it is recognizable that the resin composition according to one embodiment of the present invention is superior in reflectivity, heat resistance, maintenance of reflectivity, weather resistance, and yellowing resistance, and particularly it is suitable to be used as the material for LED reflectors.

The invention claimed is:

1. A polycyclohexylenedimethylene terephthalate resin composition, comprising:
   40 to 95 wt % of polycyclohexylenedimethylene terephthalate resin;
   12 to 35 wt % of a white pigment; and
   1 to 27 wt % of a filler,
   wherein the amount of germanium (Ge) atoms remaining in the polycyclohexylenedimethylene terephthalate resin is 30 to 1,000 ppm based on the weight of the polycyclohexylenedimethylene terephthalate resin,
   wherein the polycyclohexylenedimethylene terephthalate resin is obtained by at least one reaction selected from the group consisting of (1) an esterification reaction of a dicarboxylic acid and a diol compound and (2) a transesterification reaction of a dicarboxylic acid ester compound and a diol compound,
   wherein the dicarboxylic acid is entirely terephthalic acid, the dicarboxylic acid ester compound is entirely dimethyl terephthalate, and the diol compound is entirely cyclohexane dimethanol.

2. The polycyclohexylenedimethylene terephthalate resin composition according to claim 1, wherein the polycyclohexylenedimethylene terephthalate resin is a resin polymerized in the presence of a germanium compound.

3. The polycyclohexylenedimethylene terephthalate resin composition according to claim 1, wherein the polycyclohexylenedimethylene terephthalate resin is a resin polymerized in the presence of germanium compound and titanium compound.

4. The polycyclohexylenedimethylene terephthalate resin composition according to claim 1, wherein the white pigment is at least one selected from the group consisting of titanium oxide, zinc oxide, lithopone (BaSO4.ZnS), white lead (2PbCO3.Pb(OH)2), calcium carbonate, and boron nitride.

5. The polycyclohexylenedimethylene terephthalate resin composition according to claim 1, wherein the filler is at least one selected from the group consisting of glass fibers, carbon fibers, boron fibers, glass beads, glass flakes, talc, wollastonite, calcium titanate whiskers, aluminum boric acid whiskers, zinc oxide whiskers, and calcium whiskers.

6. An article, formed from the polycyclohexylenedimethylene terephthalate resin composition comprising:
   40 to 95 wt % of polycyclohexylenedimethylene terephthalate resin;
   12 to 35 wt % of a white pigment; and
   1 to 27 wt % of a filler,
   wherein the amount of germanium (Ge) atoms remaining in the polycyclohexylenedimethylene terephthalate resin is 30 to 1,000 ppm based on the weight of the polycyclohexylenedimethylene terephthalate resin,
   wherein the polycyclohexylenedimethylene terephthalate resin is obtained by at least one reaction selected from the group consisting of (1) an esterification reaction of a dicarboxylic acid and a diol compound and (2) a transesterification reaction of a dicarboxylic acid ester compound and a diol compound,
   wherein the dicarboxylic acid is entirely terephthalic acid, the dicarboxylic acid ester compound is entirely dimethyl terephthalate, and the diol compound is entirely cyclohexane dimethanol.

7. The article according to claim 6, which is used as a LED reflector.

8. The article according to claim 6, of which the color-b value measured after storing the same at 170° C. for 120 hrs is 0 to 4.

9. The article according to claim 6, of which the reflectivity to the light of 450 nm wavelength measured with total reflection mode is 90% or more.

10. The article according to claim 6, satisfying the following Equation 1:

$$93\% \leq Y = Rt/R0*100 \qquad \text{Equation 1}$$

in Equation 1,
Y is the maintenance of reflectivity,
R0 is the reflectivity to the light of 450 nm wavelength measured with total reflection mode by using the article, and
Rt is the reflectivity to the light of 450 nm wavelength measured with total reflection mode after storing the article at 170° C. for 120 hrs.

11. The article according to claim 6, of which the reflectivity to the light of 450 nm wavelength measured with total reflection mode after storing the article at the temperature of 85° C. and the relative humidity of 85% for 500 hrs is 90% or more.

* * * * *